US012671729B1

(12) United States Patent
K P N V D S Siva Rama

(10) Patent No.: US 12,671,729 B1
(45) Date of Patent: Jun. 30, 2026

(54) MULTI-FACTOR REQUEST THROTTLING TECHNIQUES FOR STREAMING DATA ANALYTICS SERVICES

(71) Applicant: Amazon Technologies, Inc., Seattle, WA (US)

(72) Inventor: Fnu K P N V D S Siva Rama, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 18/930,798

(22) Filed: Oct. 29, 2024

(51) Int. Cl.
H04L 65/752 (2022.01)
H04L 43/0876 (2022.01)
H04L 65/80 (2022.01)

(52) U.S. Cl.
CPC ........ H04L 65/752 (2022.05); H04L 43/0876 (2013.01); H04L 65/80 (2013.01)

(58) Field of Classification Search
CPC ..... H04L 65/752; H04L 65/80; H04L 65/765; H04L 43/0876
See application file for complete search history.

(56) References Cited

U.S. PATENT DOCUMENTS

| | | | |
|---|---|---|---|
| 9,178,827 | B2 | 11/2015 | Kaplan et al. |
| 9,471,393 | B2 | 10/2016 | Xiao et al. |
| 9,858,322 | B2 | 1/2018 | Theimer et al. |
| 10,437,635 | B2 | 10/2019 | Layman et al. |
| 10,649,837 | B2 | 5/2020 | Sharifi Mehr |
| 11,252,149 | B1 | 2/2022 | Bang et al. |
| 11,323,373 | B2 | 5/2022 | Thanasekaran |
| 11,817,091 | B1 | 11/2023 | Singh et al. |
| 11,948,019 | B1 | 4/2024 | Singh et al. |
| 2021/0266343 | A1* | 8/2021 | St. Pierre ............ H04L 63/0227 |
| 2026/0004784 | A1* | 1/2026 | K P N V D S Siva Rama .......... G10L 15/26 |

* cited by examiner

*Primary Examiner* — Kostas J Katsikis
(74) *Attorney, Agent, or Firm* — Robert C. Kowert; Kowert, Hood, Munyon, Rankin & Goetzel, P.C.

(57) ABSTRACT

An analysis request for a data stream is received at a streaming data analytics service from a client associated with a customer account. A set of concurrency snapshot records of the customer account is retrieved from a data store and used to compute a request rate acceleration metric of the account. Based at least in part on the acceleration metric, the analysis request is accepted and analysis of the data stream is initiated.

20 Claims, 10 Drawing Sheets

Acceleration-based request throttling parameters 464

Number of successive RRAs to examine = 3,
Snapshot interval = 60 seconds,
Threshold for request rejection = [RRA >= 100]

Cached concurrency snapshot records (CSRs) 450 for customer account CAID04472 and API1 →

| Key 410 (contains customer account ID, API, timestamp) | Value 412 (in-progress stream count) |
|---|---|
| CAID04472-API1-11-00-00 | 150 |
| CAID04472-API1-11-01-00 | 225 |
| CAID04473-API1-11-02-00 | 370 |
| CAID04473-API1-11-03-00 | 650 |

Request rate acceleration metrics (RRA) computations 460 ($RRA_{n+1} = (C_{n+1} - C_n)*100/C_n$)

↓

| Request Rate Acceleration Metric RRA1 [11-00-00 to 11-01-00] | (225-150)*100/150 = 50 |

| Request Rate Acceleration Metric RRA2 [11-01-00 to 11-02-00] | (370-225)*100/225 = 64.4 |

| Request Rate Acceleration Metric RRA3 [11-02-00 to 11-03-00] | (650-370)*100/370 = 75.7 |

↓

Acceleration based request throttling decision 480 = ACCEPT

*FIG. 4*

Figure 5:
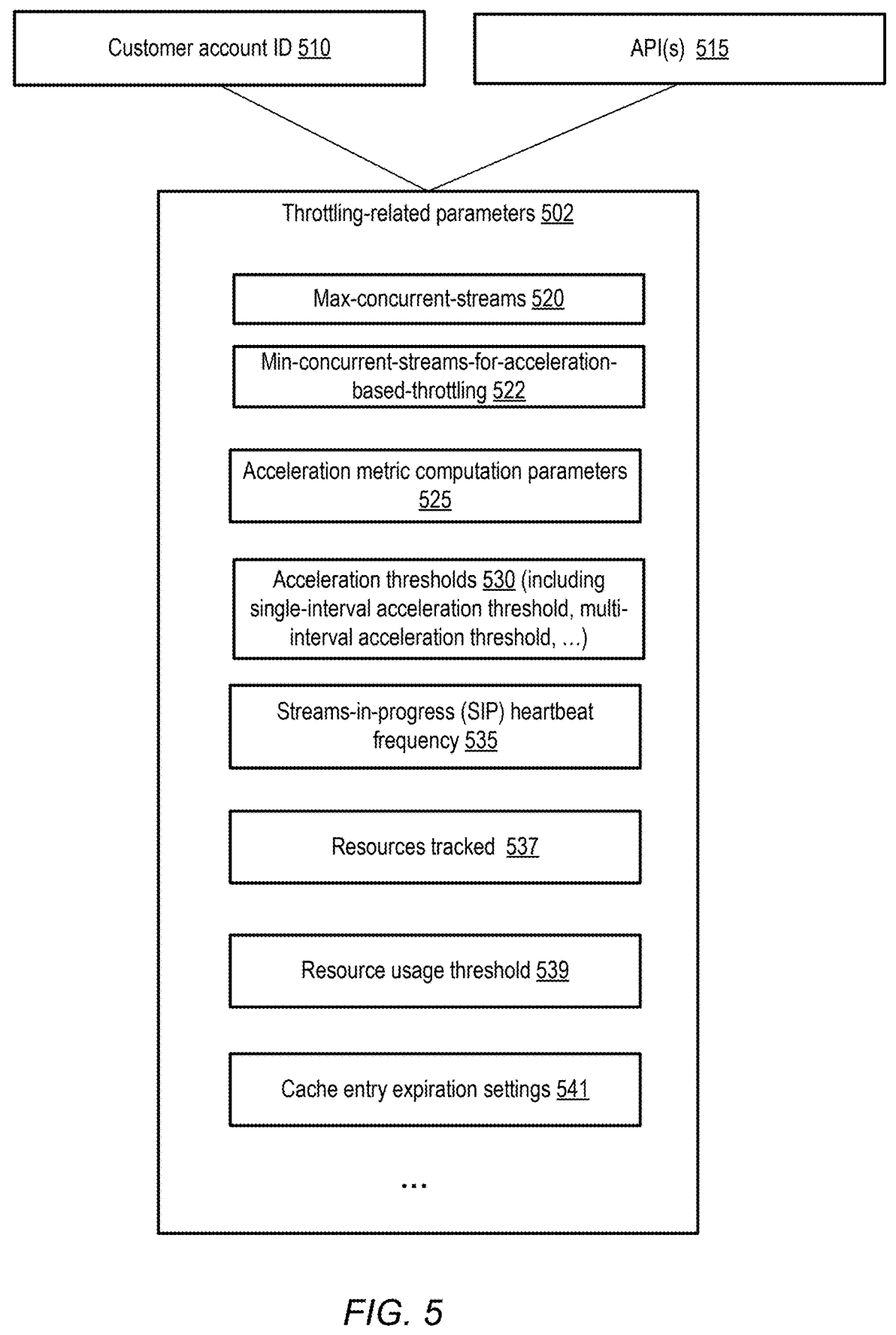

| Customer account ID 510 | | API(s)  515 |

Throttling-related parameters 502

| Max-concurrent-streams 520 |

| Min-concurrent-streams-for-acceleration-based-throttling 522 |

| Acceleration metric computation parameters 525 |

| Acceleration thresholds 530 (including single-interval acceleration threshold, multi-interval acceleration threshold, ...) |

| Streams-in-progress (SIP) heartbeat frequency 535 |

| Resources tracked  537 |

| Resource usage threshold 539 |

| Cache entry expiration settings 541 |

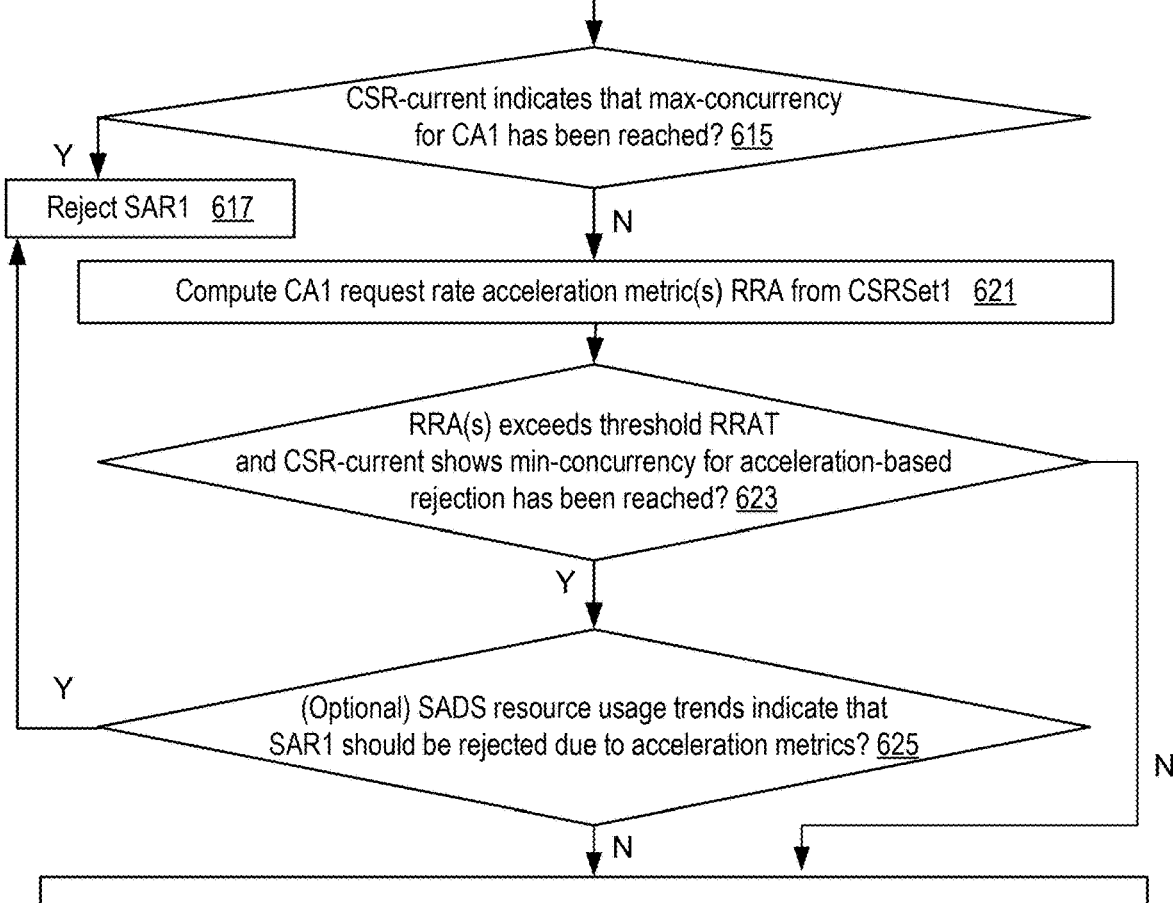

Determine, at a network-accessible streaming data analytics service (SDAS) of a cloud computing environment, based at least in part on customer-specific desired concurrency requirements, respective sets of throttling parameters for different customer accounts, including at least some request rate acceleration thresholds RRATs to be used to reject requests; the SDAS includes multiple front-end nodes (FNs) responsible for request throttling related operations, and a set of backend nodes (BNs) at which the application logic runs   601

Receive a new stream analysis request SAR1 associated with a customer account CA1 at a front end node FN1   607

Retrieve, e.g., from a distributed in-memory cache accessible to numerous front-end nodes including FN1, a set of concurrency snapshot records (CSRs) CSRSet1 of CA1; a given CSR indicates the number of in-progress streams of CAI at a given point in time, and one of the CSRs CSR-current shows the most recently updated number of in-progress streams   611

CSR-current indicates that max-concurrency for CA1 has been reached?   615

Y

Reject SAR1   617

N

Compute CA1 request rate acceleration metric(s) RRA from CSRSet1   621

RRA(s) exceeds threshold RRAT and CSR-current shows min-concurrency for acceleration-based rejection has been reached?   623

Y

Y (Optional) SADS resource usage trends indicate that SAR1 should be rejected due to acceleration metrics?   625

N

N

Accept SAR1, increment number of in-progress streams in CSR-current (or a new CSR) in cache, start processing of data stream of SAR1 at backend subsystem   630

*FIG. 6*

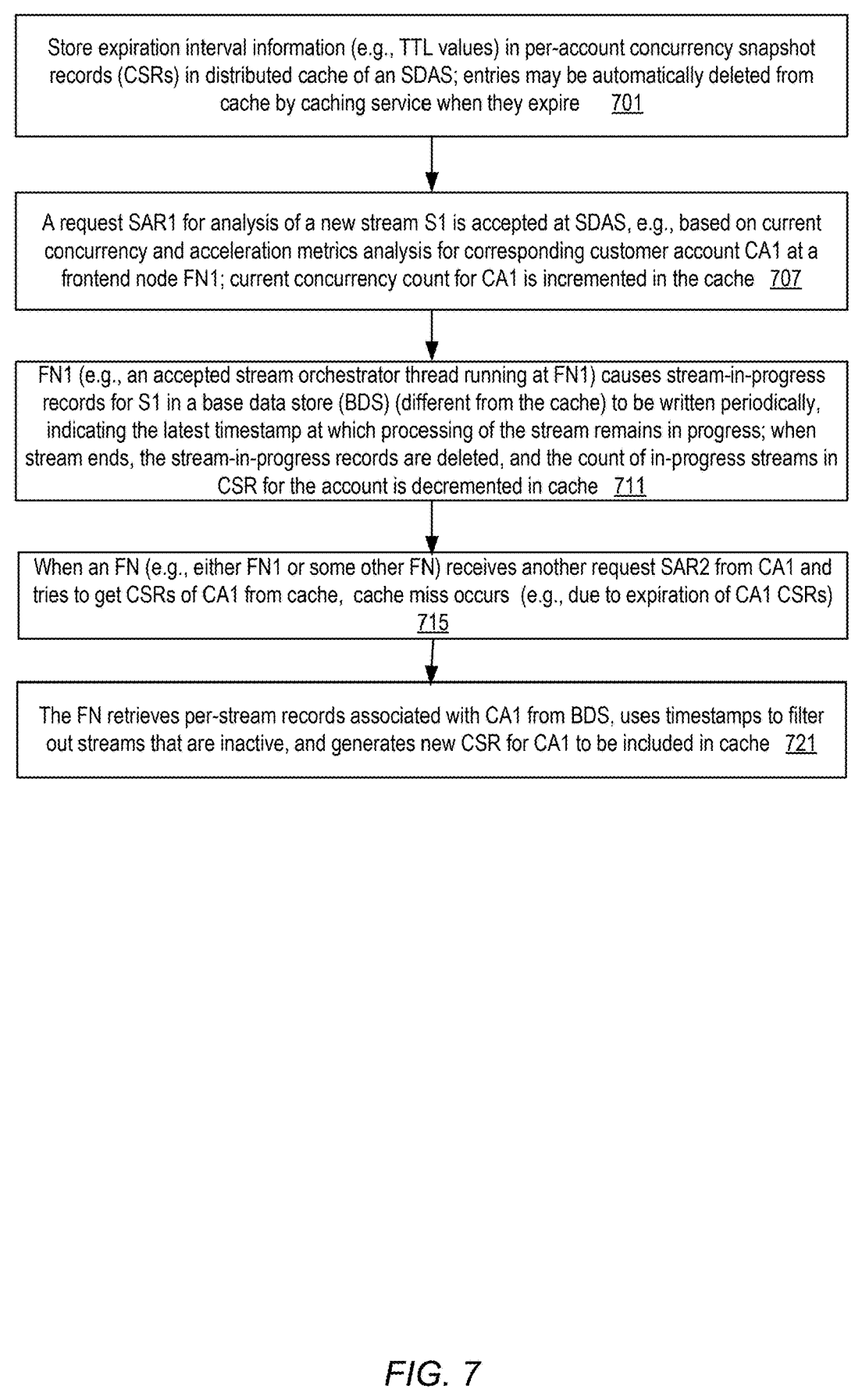

Store expiration interval information (e.g., TTL values) in per-account concurrency snapshot records (CSRs) in distributed cache of an SDAS; entries may be automatically deleted from cache by caching service when they expire    701

A request SAR1 for analysis of a new stream S1 is accepted at SDAS, e.g., based on current concurrency and acceleration metrics analysis for corresponding customer account CA1 at a frontend node FN1; current concurrency count for CA1 is incremented in the cache    707

FN1 (e.g., an accepted stream orchestrator thread running at FN1) causes stream-in-progress records for S1 in a base data store (BDS) (different from the cache) to be written periodically, indicating the latest timestamp at which processing of the stream remains in progress; when stream ends, the stream-in-progress records are deleted, and the count of in-progress streams in CSR for the account is decremented in cache    711

When an FN (e.g., either FN1 or some other FN) receives another request SAR2 from CA1 and tries to get CSRs of CA1 from cache, cache miss occurs (e.g., due to expiration of CA1 CSRs)    715

The FN retrieves per-stream records associated with CA1 from BDS, uses timestamps to filter out streams that are inactive, and generates new CSR for CA1 to be included in cache    721

*FIG. 7*

MULTI-FACTOR REQUEST THROTTLING TECHNIQUES FOR STREAMING DATA ANALYTICS SERVICES

BACKGROUND

Machine learning models hosted at cloud computing environments are increasingly used for numerous types of analytics applications. In some cases, analysis of streaming data may be performed using cloud-based services; for example, a transcription service may be used to generate transcripts of audio inputs in real time using machine learning techniques. As some streams may last much longer than others, managing the workload associated with analysis of streaming data at cloud resources can present a non-trivial technical challenge.

BRIEF DESCRIPTION OF DRAWINGS

FIG. 4 illustrates a simple example of request rate acceleration metric computations at a front end node of a streaming data analytics service, according to at least some embodiments.

FIG. 5 illustrates example request throttling related parameters which may be used for workload management at a streaming data analytics service, according to at least some embodiments.

FIG. 6 is a flow diagram illustrating aspects of operations which may be performed at a front end node of a streaming data analytics service to determine whether to accept a stream analysis request, according to at least some embodiments.

FIG. 7 is a flow diagram illustrating aspects of operations which may be performed to generate and utilize time-stamped stream-in-progress records for request throttling related tasks at a streaming data analytics service, according to at least some embodiments.

Figure 1:
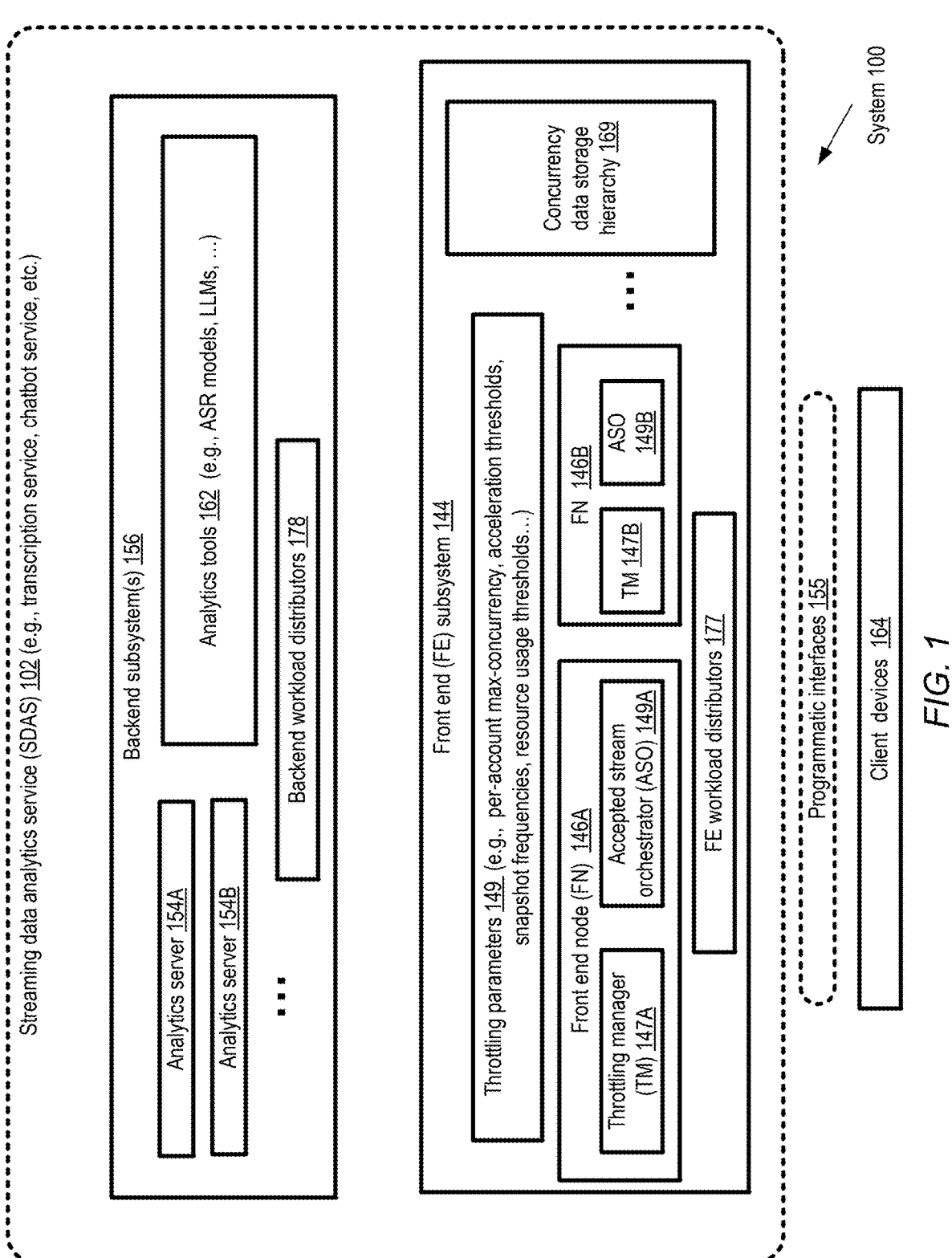
FIG. 1 illustrates an example system environment in which multiple factors including request rate acceleration metrics may be used at a network-accessible streaming data analytics service to throttle requests for analysis of data streams, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for intelligent multi-factor request throttling at network-accessible services used for streaming data analysis at cloud provider networks. The term "throttling," as used herein, refers to the rejection of requests submitted to the services by end users based on workload management parameters. Examples of such services may include, among others, transcription services which generate text transcripts of ongoing audio input streams from end users in real time, chatbot services which are required to analyze and respond to audio and/or multi-modal input streams of end users in real time, and so on. Such services may be referred to herein as streaming data analytics service (SDASs) or stream analysis-based application management services (SAAMS). The applications managed with the help of the SDAS on behalf of various customer organizations or accounts may include transcription applications for various languages, chatbots for various problem domains such as travel planning, customer support, and the like. Both the input and output of an SDAS may consist of streaming data for at least some use cases—e.g., an input data stream may be analyzed, and a corresponding output data stream based on results of the analysis may be presented to the end user and/or to other destinations. As such, the SDAS may be described as a bi-directional streaming system.

In many cases, an SDAS may be configured as a multi-tenant service which processes streams from numerous (e.g., hundreds or thousands) of end users concurrently, with individual ones of the end users being associated with a customer account of the cloud computing environment at which the SDAS is implemented. For efficiency and/or other reasons, at least some of the computing resources used for stream analysis at an SDAS may be utilized concurrently for stream analysis requests associated with multiple customer accounts. The duration of input streams of an SDAS may vary substantially in various embodiments; for example, some input streams may last for just a few seconds, while others may last for several hours. As a result, the amount of computing and other resources of the SDAS that have to be devoted to a given input stream may vary as well. In at least some embodiments, to help ensure service stability, performance, availability and/or reliability, limits or "throttling" may be imposed on the number of streams that can be analyzed concurrently on behalf of a given customer account.

Some traditional services may use straightforward throttling techniques which assume that all requests impose an (at least approximately) equal resource burden on the service. However, as indicated above, longer-lasting input streams can require more resources than shorter-lasting input streams, so assumptions about uniform resource consumption for different streams may not always be valid. Furthermore, somewhat independently of the actual resource consumption levels associated with different streams, other factors may also influence the performance and stability of the SDAS. For example, if the rate at which stream analysis requests are submitted on behalf of a given customer account accelerates or increases very quickly, this can potentially overwhelm one or more types of resources of the SDAS. In at least some embodiments, a multi-factor approach may therefore be used for throttling streams analysis requests at an SDAS. The factors taken into account for request throttling decisions in various embodiments may include, among others, request rate acceleration metrics and associated thresholds, current stream concurrency metrics, maximum stream concurrency requirements of the different customer accounts, resource utilization levels at one or more types of SDAS resources, and so on. When a request for initiating analysis of a new stream is received, in at least one embodiment the SDAS may use multiple stored records of stream concurrency information which collectively provide accurate up-to-date data on several such factors to make a decision as to whether to accept the request or not. In some embodiments, several types of concurrency-related records may be stored at various layers of a storage hierarchy used for request throttling decisions, including for example customer-account level concurrency snapshot records stored in a high-performance distributed cache, per-stream time-stamped stream-in-progress records at a remote persistent data store, and the like.

In some embodiments, an SDAS of a cloud computing environment or cloud provider network may comprise at least two types of subsystems: a front end (FE) subsystem at which request throttling decisions are made, and a backend (BE) subsystem at which the analysis of the data streams which are accepted for analysis by the FE subsystem is performed. In various embodiments, an FE subsystem may comprise a plurality of front end nodes (FNs) at which multi-factor throttling decisions may be made with regard to received requests for stream analysis. In at least some embodiments, a BE subsystem may comprise a plurality of analytics servers, at which machine learning models (such as large language models (LLMs) or other generative artificial intelligence (GAI) models, automated speech recognition (ASR) models and the like) may be run to analyze the input stream. A given input data stream may comprise a sequence of data units (e.g., comprising a respective set of end user audio segments or frames in the case of a transcription service) in various embodiments, while a corresponding output data stream produced by the BE subsystem may comprise another sequence of data units (e.g., text transcriptions of some collection of the input audio data units in the case of a transcription service).

In some embodiments, workload distributors such as load balancers may be used to direct incoming stream analysis requests to various FNs. Individual ones of the FNs of the SDAS may be provided access to several types of data stores in which stream concurrency information records (including concurrency snapshot records from which request rate acceleration metrics can be computed) can be quickly created/updated, and from which the relevant records can be quickly retrieved, in order to enable any given FN to make an informed intelligent acceptance/rejection decision for new stream analysis requests in at least some embodiments. In some embodiments, different customer account owners may request distinct volumes of maximum concurrency and/or other performance targets from an SDAS, and distinct sets of corresponding throttling parameters may be used at the FNs for requests associated with different accounts. As such, parameters used to make throttling decisions may be customized for different customer accounts in such embodiments, while ensuring fair treatment of requests from all customer accounts In one embodiment, a decision to accept or reject a stream analysis request may be made based at least in part on request rate acceleration metrics of the associated customer account, computed using one or more cached concurrency snapshot records of the associated customer account. For accepted streams, a network channel (e.g., a bi-directional streaming connection supported by an operating system) may be created and maintained between a client-side device from which the input stream's data units can be received at the SDAS, and to which the corresponding output stream's data units can be sent. If and when a stream analysis request is accepted, a concurrency count for the corresponding customer account may be increased in one or more of the data stores in some embodiments. Similarly, if and when a stream terminates (e.g., after the client-side device indicates that there is no more input to be processed for the stream, or if the connection being used for the stream is itself closed), the corresponding concurrency count may be decreased. In addition, in at least some embodiments, stream-in-progress records for individual streams which have been accepted for processing (and as a result are currently being analyzed at the BE subsystem) may be updated at various points in time in one or more of the data stores to provide an additional source of concurrency information (e.g., as a backup to customer account specific concurrency snapshots).

In some embodiments, customer account level concurrency snapshot records may be stored in a distributed in-memory cache accessible to the FNs, while stream-in-progress records (also referred to as heartbeat records) may be stored at a persistent database system. In one such embodiment, the customer account level concurrency snapshot records may be assigned respective expiration intervals (e.g., using time-to-live or TTL settings for respective records), and expired snapshot records may be automatically deleted from the cache. In at least some embodiments, in the event of a cache miss (e.g., if an FN is unable to find records pertaining to a particular customer account in the distributed cache), the persistent database may be queried to determine whether any recent stream-in-progress records for one or more streams associated with the customer account are present in the database. If such recent stream-in-progress records are found, information contained in one or more stream-in-progress records may be aggregated to populate customer account level concurrency snapshot records in the cache. Using such different levels of a storage hierarchy, which may have distinct performance and capacity profiles, effective tradeoffs may be made in various embodiments between the speed with which the FNs can obtain up-to-date concurrency information for making throttling decisions, the amount of processing power needed to generate the up-to-date concurrency information, and the overhead associated with storing the concurrency-related records at the levels of the storage hierarchy.

As one skilled in the art will appreciate in light of this disclosure, certain embodiments may be capable of achieving various advantages, including some or all of the following: (a) ensuring that desired levels of overall performance and availability can be provided to numerous (e.g., tens of thousands) of concurrent users of a stream analysis application management service, associated with customer accounts for which respective levels of overall concurrency have been requested by account owners or administrators, (b) ensuring that fluctuations in incoming stream analysis requests from any given customer account do not negatively impact the end user experience for any other customer account and/or (c) ensuring that utilization levels of the resources used at an SDAS are maintained within desired ranges, so as to avoid over-provisioning or under-provisioning resources.

According to some embodiments, a system may include one or more computing devices. The computing devices may include instructions that upon execution on or across the one or more computing devices determine, at a streaming data analysis service (SDAS), a set of account-specific request throttling parameters for requests from a given customer account. The SDAS may comprise a plurality of front-end nodes (FNs) in some embodiments, responsible for making decisions to accept or throttle received individual stream analysis requests. The set of account-specific request throttling parameters of the given customer account may, for example, include a first request rate acceleration threshold which differs from respective request rate acceleration thresholds of other sets of account-specific request throttling parameters for requests directed to the SDAS from other customer accounts.

A client (e.g., an end user utilizing a particular client device such as a laptop, phone, desktop or the like) associated with the customer account may submit an analysis request for a particular (yet-to-be-initiated) stream in various embodiments via one or more programmatic interfaces of the SDAS. In response to receiving the request, one or more concurrency snapshot records (CSRs) of the customer account may be retrieved to a particular FN of the SDAS from a consistent distributed cache accessible to the plurality of FNs in some embodiments. An individual CSR may indicate at least a number of in-progress streams of the customer account at a particular time, e.g., with a timestamp field of the CSR indicating the time and/or a time range to which the number of in-progress streams applies. Using the one or more retrieved CSRs, at least one request rate acceleration metric (RRA) of the customer account may be computed in various embodiments at the FN. Based at least in part on the RRA and the first request rate acceleration threshold, the request may be accepted by the FN, and processing of the particular stream may be initiated (e.g., using resources of a backend subsystem of the SDAS) in various embodiments. One or more factors other than the RRA itself, such as the current number of concurrent streams of the customer account, may also be taken into account in various embodiments as described below in further detail when deciding whether to accept or reject the request. When a request for a new stream is accepted, the value of the number of concurrent streams of the corresponding customer account may be incremented in at least one concurrency snapshot record in the consistent distributed cache in various embodiments. Similarly, when a stream is terminated, the value of the number of concurrent streams of the corresponding customer account may be decremented in at least one concurrency snapshot record (which may in some cases differ from the concurrency snapshot record in which the number was incremented when the stream was accepted).

In various embodiments, prior to completion of processing of the particular stream which was accepted, the FN at which the corresponding request was accepted may cause a sequence of timestamped stream-in-progress records associated with the particular data stream to be stored in a repository or data store other than the consistent distributed cache. In response to a subsequent cache miss in the consistent distributed cache (e.g., resulting from automated expiration/deletion of records from the cache based on respective TTLs), a particular CSR of the customer account may be stored in the consistent distributed cache in some embodiments. At least a portion of content of the particular CSR may be based at least in part on analysis of timestamps of at least a portion of the sequence of timestamped stream-in-progress records associated with the particular data stream. For example, only those stream-in-progress records whose timestamps lie within a recent time interval may be analyzed to populate the new CSR. The new CSR may be assigned a new TTL, and may be used to respond to one or more new stream analysis requests associated with the customer account until the TTL expires in some embodiments.

In at least one embodiment, one of the factors used by an FN to determine whether to accept or reject a new stream analysis request may comprise a current number of in-progress streams of the corresponding customer account. In one such embodiment, if the current number of in-progress streams (which may be computed at an FN using a most recent CSR and/or other types of concurrency records) exceeds or equals a first threshold associated with the customer account, a new stream analysis request may be rejected regardless of acceleration metrics. In another embodiment, if the current number of in-progress streams of the customer account is below a second threshold (e.g., a threshold which is lower than the first threshold), the new request may be accepted regardless of acceleration metrics. As such, in some embodiments, acceleration dependent throttling may only be used for a given customer account if the current concurrent number of streams is above the second threshold, thereby ensuring that customer accounts with very low levels of concurrency are not throttled during start-up phases such as the start of a business day when the total number of in-progress streams starts off at a very low value and rises relatively quickly for a while before stabilizing.

In some embodiments, an SDAS or SDAS may implement several different application programmatic interfaces (APIs) for requesting analysis of data streams. For example, stream analysis request API SAR-API1 may be used to request analysis of streams originating at phones or other mobile devices (where the quality of the audio signal may vary from one stream data unit to another), while stream analysis request API SAR-API2 may be used to request analysis of streams from stationary devices such as fixed microphones at a business facility. In some such embodiments, respective throttling parameters may be used for individual ones of the APIs—e.g., the acceleration thresholds and acceleration metrics used to reject SAR-API1 requests may differ from the acceleration threshold and acceleration metric used to reject SAR-API2 requests.

In at least one embodiment, acceleration dependent throttling may only be utilized if the current or projected level of resource utilization at one or more types of SDAS resources exceeds a threshold. This type of approach may be taken, for example, to ensure that if the SDAS has sufficient resource capacity capable of handling a given anticipated or actual burst of accelerated analysis requests, such requests should be accepted even if they may violate the normal acceleration-related thresholds that would apply.

FIG. 1 illustrates an example system environment in which multiple factors including request rate acceleration metrics may be used at a network-accessible streaming data analytics service to throttle requests for analysis of data streams, according to at least some embodiments. As shown, system 100 may include resources and artifacts of a streaming data analytics service (SDAS) 102, such as an audio-to-text transcription service, a chatbot service, and the like. SDAS 102 may comprise a backend subsystem 156 and a front end (FE) subsystem 144 in the depicted embodiment. The backend subsystem may be used to analyze data streams that have been accepted for analysis by the FE subsystem in at least some embodiments.

The FE subsystem 144 may comprise a plurality of front end nodes (FNs) in the depicted embodiment, such as FN 146A and FN 146B. The FE subsystem may also include FE workload distributors 177 such as one or more load balancers. In at least some embodiments, the FE subsystem may include or have access to a concurrency data storage hierarchy 169 comprising several types of storage at which information about the in-progress data streams of various SDAS customers is maintained. The SDAS may implement a set of programmatic interfaces 155 in the depicted embodiment, such as a set of application programming interfaces (APIs), command-line tools, web-based consoles, graphical user interfaces and the like. The programmatic interfaces 155 may be used by customers or clients of the SDAS (individual ones of which may be associated with an SDAS customer account) to send various types of requests pertaining to the analysis of data streams at the SDAS from client devices 164 (such as desktops, laptops, mobile computing devices and the like), including for example requests indicating a maximum concurrent number of streams that should be accepted for a given customer account, requests to initiate processing or analysis of new streams, and the like. In various embodiments, when a request to analyze a new stream (a stream that has not yet started) is received via programmatic interfaces 155, an FE workload distributor 177 may select a particular FN to make a decision as to whether the request should be accepted or rejected.

Individual ones of the FNs may comprise a respective throttling manager (TM) such as TM 147A or TM 147B, an accepted stream orchestrator (ASO) such as ASO 149A or 149B, as well as several other subcomponents of the kind discussed below in the context of FIG. 2. A given FN may comprise software running at one or more computing devices in the depicted embodiment. Individual ones of the TMs, ASOs and other FN subcomponents may comprise respective processes or threads in at least some embodiments. The FNs may use throttling parameters 149 expressed in terms of a variety of factors to make decisions regarding acceptance or rejection of stream analysis requests from clients in the depicted embodiment. Throttling parameters 149 may include, among others, maximum stream concurrency thresholds, request rate acceleration thresholds, concurrency snapshot record creation frequencies, resource usage thresholds, and the like as discussed below in further details. In at least some embodiments, throttling parameter values used for making decisions regarding requests associated with one customer account may differ from the corresponding parameter values used for making decisions regarding requests associated with another customer account. As such, throttling parameters may be customized for respective customer accounts in such embodiments. In one embodiment in which multiple end users are affiliated with a given customer account of the SDAS, respective sets of distinct throttling parameters may be used for requests of individual end users. In various embodiments, one or more of the throttling parameters to be used for requests associated with a given customer account may be determined at least in part based on input provided by an authorized administrator or owner of the customer account. For example, the account owner may specify a desired level of performance for streams that are to be processed on behalf of the account, and various other throttling parameters (such as acceptable request rate acceleration thresholds) may be chosen by the SDAS (e.g., by control plane or administrative components of the SDAS) based on the desired level of performance.

In at least some embodiments, the SDAS may be used to manage large volumes of concurrent streams (e.g., hundreds of thousands of streams) of numerous customers. In order to make request throttling decisions quickly, a multi-layer concurrency data storage hierarchy 169 may be employed in such embodiments. The storage hierarchy may, for example, include a distributed consistent in-memory cache implemented using a caching service of a cloud computing environment of which the SDAS is a part, one or more persistent data stores at which non-relational or relational database instances are set up, and so on.

The backend subsystem may comprise a collection of analytics servers such as analytics server 154A and analytics server 154B, and a set of backend workload distributors 178 in some embodiments. At the analytics servers, one or more analytics tools 162, such as automated speech recognition (ASR) machine learning models, large language models (LLMs) and the like may be executed to process or analyze data streams received as input from customers or clients of the SDAS. In some embodiments, processing of multiple portions or units of a given data stream may be performed at a particular analytics server selected for the stream (e.g., using hashing based load balancing schemes) by a backend workload distributor such as a load balancer.

In at least one embodiment, one of the layers of the storage hierarchy, such as a distributed cache, may be used to store concurrency snapshot records (CSRs) for individual ones of the customer accounts of the SDAS. CRSs may be used for at least two purposes in some embodiments: to determine the current number of concurrent in-progress streams of various customer accounts, and to determine the rate of acceleration of requests from various customer accounts. A given CSR may indicate, for example, a number of currently in-progress streams associated with a given customer account at a particular point in time (or time range) indicated by a timestamp. For example, one CSR CSR1 of a customer account AccountID-1 may indicate that as of time T1, N1 streams were being processed concurrently on behalf of clients associated with AccountID-1. A second CSR CSR2 for the same customer account may indicate that as of time T2 (e.g., 30 seconds after T1), N2 streams were being processed concurrently on behalf of clients associated with AccountID-1, and a third CSR CSR3 may indicate that as of time T3 N3 streams were being processed concurrently on behalf of clients associated with AccountID-1. In some embodiments, individual ones of the CSRs may have expiration time indicators (such as time-to-live (TTL) values), and CSRs may be deleted from the cache when they expire. In some embodiments, the most recent or newest CSR among the set of CSRs for a given customer account may actually have a timestamp in the future, so that this most recent CSR can be updated as new stream analysis requests are accepted or as existing streams are ended/terminated. For example, if in a particular embodiment new CSRs are generated every 10 seconds for a given customer account, at 11:00:01 AM the cache may include a CSR with a timestamp of 10:59:50 AM, another CSR with a timestamp of 11:00:00 AM, and the newest CSR with a timestamp of 11:00:10 AM (even though the current time is less than 11:00:10 AM). When a new stream analysis request is accepted between 11:00:00 AM and 11:00:10 AM in this example, the count of concurrent streams in the 11:00:10 AM CSR may be incremented. Similarly, if a stream that was being processed terminates or ends between 11:00:00 and 11:00:10, the count of concurrent streams in the 11:00:10 AM CSR may be decremented. In such an embodiment, CSRs may be updatable until their timestamp is reached, and read-only thereafter.

In various embodiments, when a request for analysis of a new stream is received at an FN, some number of CSRs for the corresponding customer account may be retrieved from the distributed cache. The current number of concurrent streams of the account, as well as a request rate acceleration metric for the account, may be determined or computed at the FN using the CSRs in some embodiments. Depending on the applicable throttling parameters for the account (including for example a maximum request rate acceleration threshold for the account), the request may be accepted or rejected. If the request is accepted, in various embodiments, analysis of the stream may be initiated, e.g., by sending data units of the stream to the backend subsystem, and the concurrent streams count for the customer account may be incremented in the cache. In at least one embodiment, an accepted stream orchestrator (ASO) of the FN may send the stream contents to the backend subsystem on an ongoing basis—e.g., as additional data units of the stream are sent by the stream source or analysis requester, the ASO may send the data units on to the backend subsystem. If the request is rejected, the submitter of the request may be notified, e.g., by sending an error message or an exception in some embodiments. For accepted requests, the analytics servers of the backed subsystem may analyze the stream contents as they arrive, and results of the analysis may be sent via the reverse path (e.g., via the FN to the submitter of the stream analysis request and/or to one or more other destinations indicated by the submitter).

In various embodiments, the cached count of concurrent streams of the customer account (in the newest CSR of the account) may be decremented if/when the stream terminates. In order to make throttling decisions based on accurate information, the incrementing and decrementing of the counts of concurrent streams may need to be performed accurately. However, it may sometimes be the case that the count is not updated correctly—for example, between the time that a stream is terminated by a client and the time that the corresponding decrement operation is performed in the cache by the FN, the FN may itself exit or fail. These types of inaccuracies can potentially accumulate over time, leading to a drift away from accurate/correct concurrency information in the cache.

In order to limit or eliminate such drift, in various embodiments the ASO of the FN at which a decision to accept a stream analysis request was made may also add per stream timestamped stream-in-progress (SIP) records to a data store at a persistent database layer (a layer other than the cache) of storage hierarchy 169. For example, once every T seconds during the lifetime of a given stream S1, an SIP indicating that S1 remains active may be added to the data store. SIPs may also be referred to as heartbeat records in at least some embodiments. CSRs for inclusion in the distributed cache may be periodically generated by analyzing such SIPs in various embodiments, e.g., in response to a cache miss. In effect, the per-stream information represented in the SIPs may be aggregated at the customer account level to create CSRs in such embodiments (e.g., by combining information contained in all the SIPs associated with the customer account whose timestamps lie within a recent time interval). Additional details regarding the schemas that may be sued at various layers of the storage hierarchy are provided below. In at least some embodiments, in addition to using some of the concurrency-related factors indicated above, traditionally used factors such as raw request rates may be used by FNs to make request throttling decisions.

Figure 2:
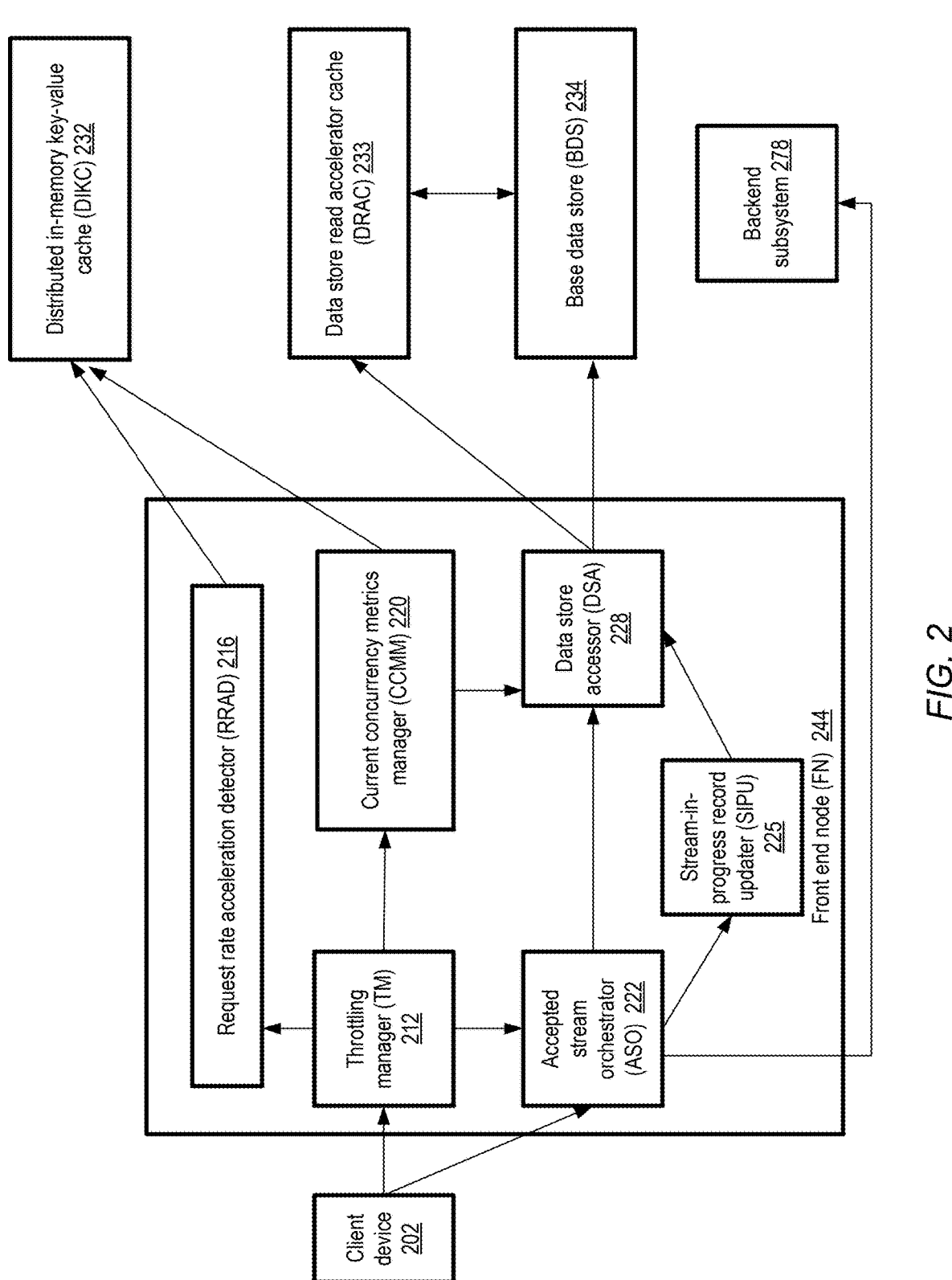
FIG. 2 illustrates example components of a front end node of a streaming data analytics service, according to at least some embodiments.

FIG. 2 illustrates example components of a front end node of a streaming data analytics service, according to at least some embodiments. Front end node (FN) 244 may include, among other components, a throttling manager (TM) 212, an accepted stream orchestrator (ASO) 222, a request rate acceleration detector (RRAD) 216, a current concurrency metrics manager (CCMM) 220, a data store accessor (DSA) 228, and a stream-in-progress record updater (SIPU) 225 in the depicted embodiment. In at least some embodiments, a given FN 244 may comprise some combination of hardware and software of one or more computing devices. In some embodiments, individual ones of the components of FN 244 may comprise one or more software threads or processes.

At least three types of storage may be used for records containing data utilized for throttling decisions in the depicted embodiment. A consistent distributed in-memory key-value cache (DIKC) 232 may be used, for example, to store customer account-specific concurrency snapshot records (CSRs) of the kind introduced above. A base data store (BDS) 234 may comprise a persistent database (such as a key-value database) at which stream-in-progress records (SIPs) may be stored for individual streams that have been accepted for analysis at the SDAS. In at least one embodiment, the BDS may have an associated short-duration data store read accelerator cache (DRAC) 233 which may be used to speed up reads directed to the BDS.

When a request for analyzing a new (yet-to-be initiated or analyzed) stream is received at FN 244 from a client device 202 of a client associated with a particular customer account (e.g., via a front end workload distributor), TM 212 may analyze the request to identify the customer account in various embodiments. TM 212 may send a request to CCMM 220 to determine the current count of concurrent streams of the customer. CCMM 220 may try to look up the latest CSR for the account in DIKC 232 to determine the current count. If the current count equals or exceeds a first rejection threshold, the request may be rejected in various embodiments. If the DIKC does not contain a CSR (e.g., because no other streams of the same customer account have been processed, or because the CSRs that were present in the DIKC have expired and been deleted from the DIKC), the CCMM may try to obtain stream-level SIPs for various streams of the customer account from the DRAC or the BDS, and generate a new CSR for the customer account by aggregating the stream-level information into an account-level CSR in the depicted embodiment. In at least some embodiments, communications between the FN and the BDS (or between the FN and the DRAC) may be conducted by DSA 228. As such, when obtaining SIPs, the CCMM may send a request for the SIPs to the DSA, and the DSA may attempt to find SIPs in the DRAC or (e.g., in the event that SIPs for the account are not in the DRAC) the BDS. If no SIPs for the account are found, a new CSR (with a current stream count of zero or one) may be created for the customer account by the CCMM and stored in the DIKC in at least some embodiments.

If the current number of concurrent streams of the customer account is below the first rejection threshold, in at least some embodiments, the TM may determine whether the current number of concurrent streams is below a second threshold referred to as a low acceptance threshold. If this is the case, the request may be accepted, and the current count may be incremented (e.g., by the CCMM) in the CSR for the account in the DIKC.

In various embodiments, if the current number of concurrent streams of the account is below the first rejection threshold and above the loa acceptance threshold, acceleration metrics and thresholds may be used to make the throttling decision. TM 212 may request acceleration metrics for the customer account from RRAD 216. RRAD 216 may obtain a set of one or more CSRs for the account from DIKC 232 and use the CSRs to compute one or more request rate acceleration metric(s) for the customer account. The acceleration metric(s) may be compared with acceleration thresholds by TM 212, and the request may be accepted or rejected based on results of the comparison (e.g., if the acceleration is below a threshold, the request may be accepted, and otherwise the request may be rejected). If the request is accepted, the current concurrency count in the latest CSR for the account may be incremented by the CCMM 220, and the ASO 222 may be notified that a new stream has been accepted for analysis. As and when data units of the accepted stream are received at the FN from the client device 202, they may be forwarded to the backend subsystem 278 for processing in the depicted embodiment. The reverse path for conveying results of the processing is not explicitly shown in FIG. 2.

In addition to sending data of the stream to the backend, the ASO may also periodically cause SIPU 225 to generate SIPs for the stream during the lifetime of the stream (e.g., while the stream is not explicitly or implicitly terminated). Each SIP may identify a stream which continues to be processed, the customer account associated with the stream, and indicate a timestamp or heartbeat indicating the time at which the SIP is created. The SIPs may be written to BDS 234 by SIPU 225 via the DSA 228 in at least some embodiments. If and when a cache miss occurs in DIKC 232 for a given customer account, SIPs for various streams of that account may be used to generate one or more CSRs in DIKC 232, which can subsequently be used to make throttling decisions by the FN for additional stream analysis requests in the depicted embodiment.

Figure 3:
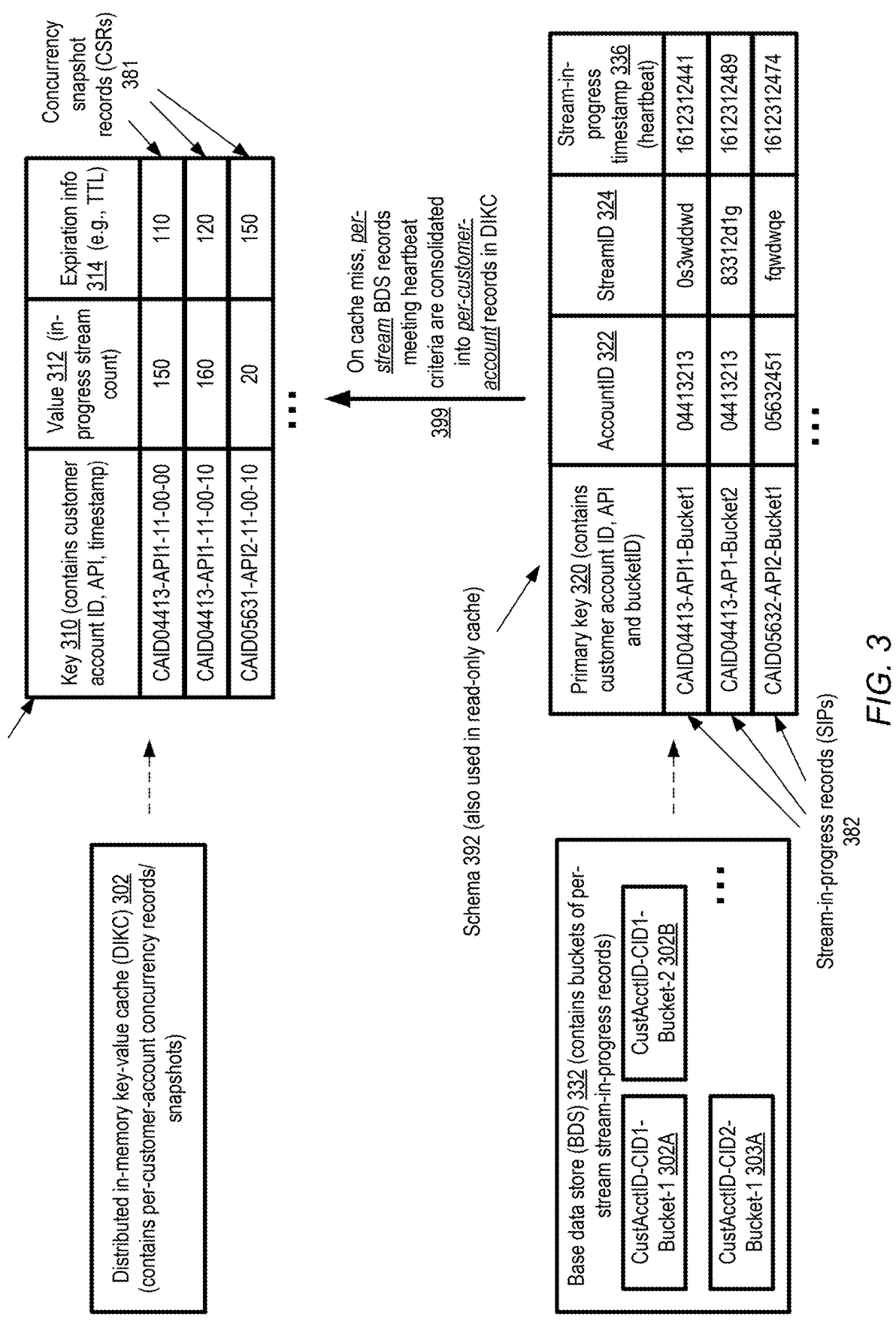
FIG. 3 illustrates example request throttling related schemas of records stored at different levels of a storage hierarchy used at front end nodes of a streaming data analytics service, according to at least some embodiments.

FIG. 3 illustrates example request throttling related schemas of records stored at different levels of a storage hierarchy used at front end nodes of a streaming data analytics service, according to at least some embodiments. In distributed in-memory key-value cache (DIKC) 302, schema 391 may be used in some embodiments to store per-customer-account concurrency records or CSRs of the kind introduced above. In base data store (BDS) 332 and its associated read-only cache, schema 392 may be used in some embodiments to store per-stream SIPs, with multiple sets of SIPs being stored for the different streams of a given customer account. For storing SIPs of streams of some customer accounts that have very large numbers of streams concurrently in progress, separate partitions or buckets may be created within BDS 332 in some embodiments, with respective buckets being stored for example on respective persistent storage devices to balance workloads.

Keys 310 of schema 391 used for storing CSRs 381 may be constructed by combining a customer account identifier, an optional API name or identifier, and a timestamp in the depicted embodiment. For example, CAID04413 may be a customer account identifier, API1 may be the name of a first API used to send stream analysis requests to the SDAS, and 11-00-00 may be a timestamp indicating hours (11) minutes (00) and seconds (00). In some embodiments, the key 310 may not include an API—e.g., a single key may be used for concurrency snapshot information pertaining to all the APIs supported by the SDAS. The value 312 may indicate the count of in-progress streams of the customer account which were requested using the API specified in the key in some embodiments. In at least some embodiments, each CSR may also have expiration information 314 associated with it, such as a TTL after which the CSR may be deleted automatically by the underlying cache management software or by a background cache cleaner thread.

For some customer accounts, as indicated above, multiple buckets or SIP collections may be created to help distribute I/O workload at the BDS. For example, buckets bucket-1 302A and bucket-2 302B may be created for SIPs of one customer account, while a single bucket 303A may suffice for another customer account. Primary key 320 of schema 392 used for storing SIPs 382 may be constructed by combining the account identifier (e.g., CAID04413), the API name used for requesting analysis of the stream (e.g., API1) and a bucket identifier (e.g., bucket1) in the depicted embodiment. In some embodiments, key 320 may not include an API—e.g., a single key may be used for SIPs pertaining to all the APIs supported by the SDAS. Schema 392 may also include an account identifier field 322, a stream identifier field 324, and an SIP timestamp 336 (also referred to as a heartbeat value). In some implementations, the timestamps in the SIPs may be expressed as a single integer representing a number of milliseconds since a particular time. In at least one implementation, the timestamp portions of the key 310 of schema 391 may also be expressed in similar units. In the event of a cache miss, as indicated by arrow 399, information in per-stream BDS SIP records meeting a heartbeat recency criterion (e.g., SIPs whose heartbeat values lie within some specified interval before the time at which the CSR is to be generated) may be consolidated/aggregated to populate per-customer-account CSRs in the DIKS in the depicted embodiment (e.g., by a CCMM or some other component of an FM).

FIG. 4 illustrates a simple example of request rate acceleration metric computations at a front end node of a streaming data analytics service, according to at least some embodiments. In the example scenario shown in FIG. 4, acceleration-based request throttling parameters 464 may indicate that the number of successive request rate acceleration (RRA) metrics to examine is 3, the snapshot interval is 60 seconds, and the threshold for request rejection is that at least one RRA metric is to equal or exceed 100. An RRA may be computed using the formula $RRA_{n+1}=(C_{n+1}-C_n)*100/C_n$, where $C_n$ is the concurrency value in the CSR for snapshot interval n, and $C_{n+1}$ is the concurrency value in the CSR for snapshot interval (N+1) (the CSR with a timestamp 60 seconds after $C_n$).

Using the above formula and the concurrency values 412 shown in cached CSRs 450 for an account CAID04472 and API API1 (as indicated by the CSR keys 410), the RRA computations 460 of the illustrated example scenario indicate that three most recent RRA values at the time at which a request throttling decision was made are (in order) 50, 64.4 and 75.7. Even though these RRAs indicate that the request rate is accelerating for the account and API being considered, the RRAs are not yet high enough to justify a rejection of a new stream analysis request. As a result, the acceleration based request throttling decision 480 is to accept the request. Of course, as indicated earlier, several other factors may also be taken into account when making the decision. Note that in various embodiments, formulas other than the one shown in FIG. 4 may be used for computing RRAs, and/or the values of acceleration-related throttling parameters may differ from those shown in FIG. 4.

FIG. 5 illustrates example request throttling related parameters which may be used for workload management at a streaming data analytics service, according to at least some embodiments. Throttling-related parameters 502 may be defined or set at a per-customer account level in the depicted embodiment, with an account identifier indicated by customer account ID field 510. In at least some embodiments, values of one or more parameters may differ from one customer account to another.

In at least some embodiments, as indicated earlier, different throttling parameters may be used for controlling workloads associated with respective APIs that are used to request stream analysis and/or to send streaming data to the SDAS. The particular API or APIs to which the set of throttling parameters 502 is to apply may be indicated in API(s) field 515. In at least one embodiment, the parameters may apply to all APIs collectively, and per-API parameters or per-API-group parameters may not be used.

For the API(s) indicated in field 515 and the customer account identified in field 510, max-concurrent-streams 520 may indicate the threshold maximum number of streams that are to be processed or analyzed concurrently in the depicted embodiment. If a stream processing request is received at a point in time at which max-concurrent-streams 520 has already been reached, the request may be rejected regardless of request rate acceleration or other factors in some embodiments.

Min-concurrent-streams-for-acceleration-based-throttling 522 may indicate the lower threshold for concurrent streams for request rate acceleration to be used as a throttling factor in various embodiments. For example, if min-concurrent-streams-for-acceleration-based-throttling is set to 50, this means that request rate acceleration will not be used for throttling decisions until there are at least 50 streams being processed in parallel for the customer account and APIs to which the throttling parameters 502 apply. This threshold may be useful because for at least some customer accounts, there may be certain times of the day (e.g., when offices or other premises in a particular location open for business), week, month or tear when the number of concurrent streams that are to be processed rise rapidly from zero, thereby resulting in high request arrival rates for a short time until the workload stabilizes. The objective of using min-concurrent-streams-for-acceleration-based-throttling is to accommodate such short spurts of request rates if the baseline concurrency level at which the bursts start is low or zero, but to use acceleration-based throttling of the baseline concurrency level is already high.

Acceleration metric computation parameters 525 may include, for example, the frequency at which CSRs are generated, the number of consecutive CSRs to take into account when generating RRAs metrics, and the formula to be used for calculating the RRA (e.g., similar to the formula shown in FIG. 4) in various embodiments. Acceleration thresholds 530 may indicate the values which, if equaled or exceeded by the computed RRA metric(s), are to cause rejection or throttling of a request for which the throttling decision is being made. In one embodiment, at least two types of acceleration thresholds may be used: one threshold (referred to as a multi-interval threshold) which if exceeded more than K times in a sequence of L metric computations results in rejection of the request, and another threshold (referred to as a single-interval acceleration threshold) which if exceeded in any interval results in rejection of the request. For example, the multi-interval threshold may be used as follows: if, during at least 3 successive 60-second thresholds, the RRA metric as computed using the formula shown in FIG. 4 exceeds 50, the request should be rejected. The single-interval threshold may be used as follows: if, during any single 60-second interval the RRA metric exceeds 100, the request should be rejected.

SIP heartbeat frequency 535 may indicate the rate at which timestamped stream-in-progress records of the kind introduced above should be added to a data store (e.g., once every 10 seconds, once every 30 seconds, etc.), e.g., to be used as the source data from which cached CSRs are generated by aggregating information about all the streams of a given account.

Resources tracked 537 may indicate the categories of resources (e.g., CPUs/GPUs/memory of backend analytics servers, CPUs/GPUs/memory of FNs, network bandwidth between FE and backend systems, etc.) whose usage levels are to be tracked for the purposes of deciding whether the SDAS has enough capacity to handle anticipated request rates (including rates expected to result from acceleration of requests). For various resources, corresponding resource usage thresholds 539 may be included in the throttling-related parameters in some embodiments. For example, if the expected rate of requests over the next 30 minutes would result in a CPU utilization of 85% at a set of backed analytics servers and/or an FN which may be used for analysis of streams of the customer, a new stream analysis request may be rejected based on resources tracked 537 and resource usage thresholds 539 for the corresponding customer account.

In at least some embodiments in which a distributed in-memory cache of the kind indicated above is used to store CSRs, throttling-related parameters may include cache entry expiration settings 541 (such as TTLs) for the CSRs. In at least one embodiment, a caching service of a cloud provider network may be used for the distributed cache, and cache entries whose TTLs have expired may be remove automatically from the cache. In at least one embodiment, some or all of the parameter values chosen for a given customer account may be selected based at least in part on input provided by the account owner or administrator. For example, the account owner may specify (using programmatic interfaces of the SDAS) a desired number of concurrent streams which are to be supported, an expected average duration of the streams or a distribution of stream lifetimes, and so on, and values of the throttling-related parameters may be determined or computed based on the account owner's input. In at least one embodiment, an account owner or administrator may specify at least some of the throttling-related parameters explicitly via programmatic interfaces. In some embodiments, additional parameters not shown in FIG. 5 may be employed for workload level management for an SDAS.

FIG. 6 is a flow diagram illustrating aspects of operations which may be performed at a front end node of a streaming data analytics service to determine whether to accept a stream analysis request, according to at least some embodiments. As shown in element 601, respective sets of throttling parameters for requests of different customer accounts of an SDAS implemented at a cloud computing environment may be determined. In at least one embodiment, some or all of the parameters for a given customer account may be chosen based at least partly on input provided by an authorized entity associated with the account, such as an account owner or administrator. In one embodiment, the account owner may specify desired concurrency requirements (e.g., "for end users affiliated with my account, I want the SDAS to handle up to 500 concurrent streams of audio data lasting approximately 15 minutes each on average"), and some or all of the throttling parameters may be calculated at the SDAS based on the requirements. In some embodiments, the same values may be selected for a given parameter (such as maximum acceptable request rate acceleration thresholds) for two or more customer accounts. In at least one embodiment, different values may be selected for a given parameter for two customer accounts. Some or all of the parameters shown in FIG. 5 may be chosen for a given customer account in various embodiments, including for example request rate acceleration (RRA) thresholds to be used to reject requests when the aggregate rate of requests being received from clients associated with a given account grows excessively rapidly. The SDAS may include a collection of FNs responsible for request throttling related operations, and a set of backend nodes (BNs) at which the logic of the stream analysis application (e.g., LLMs used for transcription or chatbot conversations) runs.

A new stream analysis request SAR1 associated with a customer account CA1 (e.g., sent by an end user using credentials associated with CA1) may be received at a front end node FN1 in the depicted embodiment (element 607). A set of concurrency snapshot records (CSRs) CSRSet1 of CA1 may be retrieved to FN1 from a first data store, such as a distributed in-memory cache accessible to multiple FNs in some embodiments (element 611). A given CSR may indicate the number of in-progress (accepted and not yet terminated) streams requested by entities affiliated with CA1 at a given point in time; thus, for example, multiple CSRs showing respective stream counts of CA1 as of different timestamps may be retrieved. One of the CSRs CSR-current may show the most recently updated number of in-progress streams. As indicated earlier, CSR-current's timestamp may be in the future; in general, a given CSR may be used to reflect all the stream count changes (increments when new streams are accepted, and decrements when existing streams terminate) up to the timestamp value indicated in the CSR.

A determination may be made at FN1, using the throttling parameters relevant to CA1) as to whether the maximum permitted number of concurrent streams of CA1 has already been reached (element 615) in the depicted embodiment. If the limit has been reached SAR1 may be rejected (element 617). If the limit has not yet been reached, in various embodiments CA1's request rate acceleration (RRA) metric(s) may be computed using the CSRSet1 and a formula indicated in the throttling parameters in the depicted embodiment (element 621). If the RRA(s) exceed applicable acceleration thresholds indicated in the throttling parameters, and if CSR-current indicates that the minimum concurrency for using acceleration-based rejection has been reached by CA1 (as detected in element 623), SAR1 may also be rejected in some embodiments. In other embodiments, even if the conditions checked in element 623 indicate that SAR1 is a candidate for rejection, a resource usage based additional check may optionally be conducted (element 625). In this optional operation, SAR1 may only be rejected if all the conditions of element 623 are satisfied, and if SDAS resource usage trends (for resources indicated in the throttling parameters) indicate that because the SDAS may soon run out of resources based on acceleration trends, acceleration metrics should be used for rejection.

If the rejection-triggering conditions checked in elements 623 and/or 625 are not satisfied, SAR1 may be accepted in various embodiments (element 630). The count or number of in-progress streams in CSR-current (or a new CSR which may be created if the timestamp of the original CSR-current has passed) may be increments, and processing of the data stream corresponding to SAR1 may be initiated, e.g., by transmitting data units of the stream to the backend subsystem. Results of the analysis of the stream (e.g., transcriptions of the portion of an audio stream which has been provided as input thus far) generated at the backend subsystem may be sent to the stream analysis request submitter and/or to one or more other destinations indicated by the submitter in various embodiments.

FIG. 7 is a flow diagram illustrating aspects of operations which may be performed to generate and utilize time-stamped stream-in-progress records for request throttling related tasks at a streaming data analytics service, according to at least some embodiments. As shown in element 701, respective expiration interval information such as TTL values may be stored in per-account CSRs created within a distributed cache or similar data store for various customer accounts of an SDAS in various embodiments. In some embodiments, the caching service may automatically delete cache entries when their expiration time is reached. In other embodiments the SDAS may comprise one or more threads or processes responsible for cleaning up (deleting, or marking as invalid) CSRs that have expired.

A request SAR1 for analysis of a new stream S1 associated with a customer account CA1 may be accepted at a front end node FN1 of the SDAS, e.g., using logic similar to that shown in FIG. 6 in the depicted embodiment (element 707). Factors such as the current concurrency level of the customer account CA1, the request rate acceleration metric of CA1, etc., may be taken into account when deciding whether to accept or reject SA1. After SAR1 is accepted, the current concurrency count for CA1 may be incremented in the cache (e.g., by updating the current CSR).

As shown in element 711, stream-in-progress (SIP) records for the stream S1 may periodically be written to a base data store (BDS) (a data store other than the cache in which the CSRs are written) from FN1 in various embodiments. A given SIP may indicate a most recent timestamp at which the processing of stream S1 remains in progress. When S1 is eventually terminated, the count of in-progress streams in the current CSR may be decremented, and the SIP records for S1 may be deleted from the BDS in at least some embodiments.

At some point in time, another request SAR2 associated with CA1 may be received, e.g., at FN1 or at some other FN of the SDAS (element 715). When the receiving FN tries to find or look up CSRs for CA1 in the cache, a miss may occur (e.g., because CA1 CSRs may have expired) in some cases. If such a miss occurs, in at least some embodiments, the FN may retrieve per-stream records associated with CA1 from the BDS, use the timestamps contained in them to filter out streams that are inactive, and generate a new CSR for CA1 which is then included in the cache (element 721). As such, the FN may aggregate SIP record information for multiple streams of CA1 into a single CSR which can then be used (until it expires) for making throttling decisions for new stream requests associated with CA1.

It is noted that in various embodiments, some of the operations shown in the flow diagrams of FIG. 6 and/or FIG. 7 may be implemented in a different order than that shown in the corresponding figure or may be performed in parallel rather than sequentially. Additionally, some of the operations shown in the flow diagrams may not be required in one or more implementations.

Figure 8:
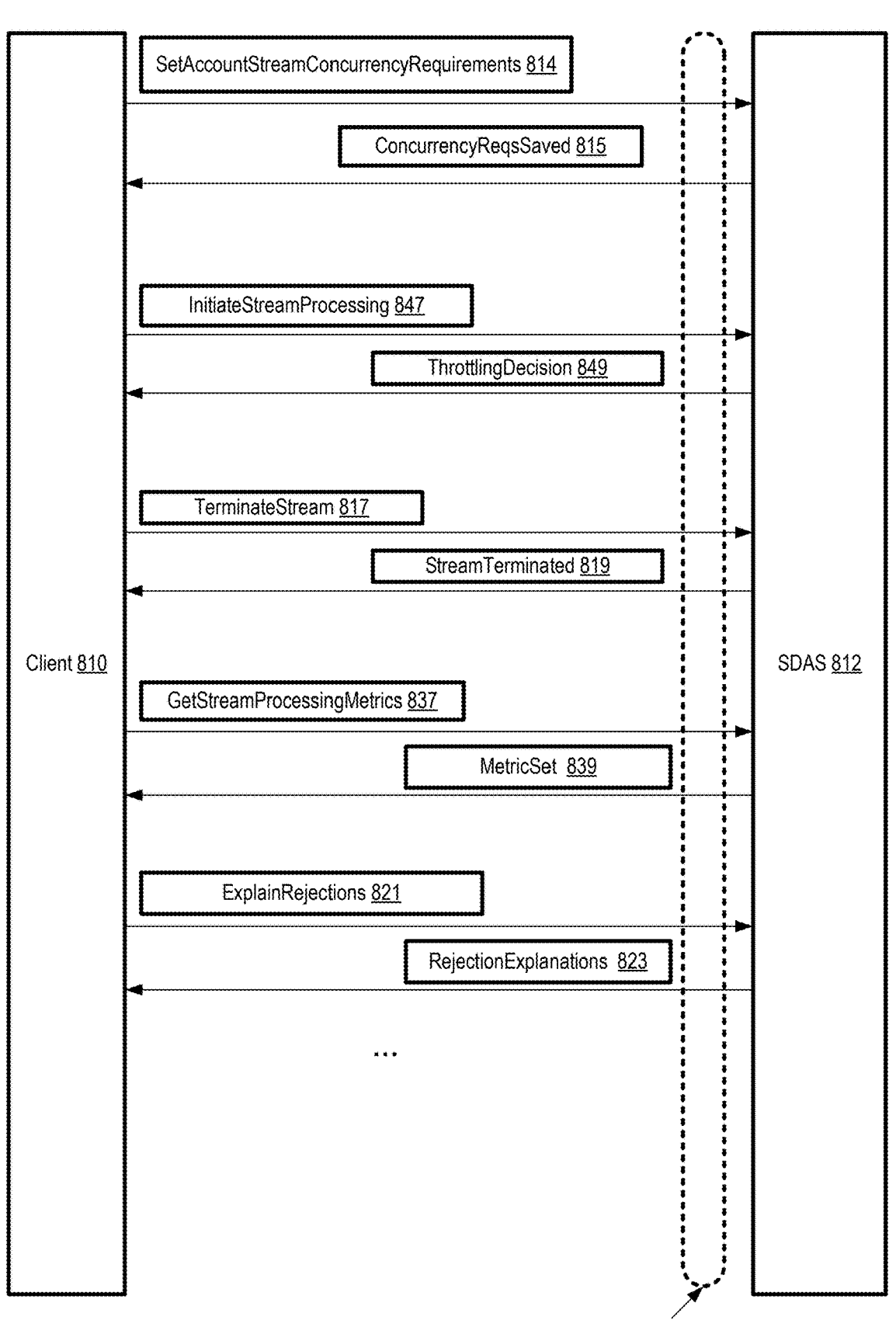
FIG. 8 illustrates example programmatic interactions between clients and a streaming data analytics service, according to at least some embodiments.

FIG. 8 illustrates example programmatic interactions between clients and a streaming data analytics service, according to at least some embodiments. An SDAS 812, similar in features and functionality to SDAS 102 of FIG. 1, may implement a set of programmatic interfaces 877 in the depicted embodiment, such as one or more web-based consoles, command-line tools, graphical user interfaces and/ or APIs. Clients 810 (such as owners, developers or end users of streams-based applications, and/or owners or administrators of customer accounts of the SDAS) may utilize the programmatic interfaces to submit requests and information pertaining to various aspects of workload management for applications run at the SDAS.

A client such as an administrator of a streams-based application (such as a transcription application or a chatbot application to be employed for a particular organization) may submit a SetAccountStreamConcurrencyRequirements request 814 via the programmatic interfaces 877 in some embodiments. Request 814 may, for example, provide an indication of a target number of concurrent streams that are to be supported by the SDAS for the customer account, the APIs that are going to be used for the streams analysis requests, an expected duration of individual streams or an expected statistical distribution of duration of the individual streams, an indication of the geographical regions or locations from which the streaming data is going to be provided as input to the SDAS, and so on. Based on such requirements, the SDAS may determine one or more other throttling parameters such as those shown in FIG. 5 in various embodiments, e.g., using heuristics or rules for generating lower-level parameters from the customer's requirements. In some embodiments, the geographical location information provided by the client may be used to select a pool of backend analytics servers and/or front end nodes in a particular data center which are to be used for requests associated with the customer account. In some embodiments, a client may explicitly specify one or more of the throttling parameters via programmatic interfaces 877, e.g., using SetThrottlingParameter requests not shown in FIG. 8. The information provided by the client in request 814 may be saved in a repository and a ConcurrencyReqsSaved message 815 may be sent to the client.

End users affiliated with a customer account (e.g., employees of an organization for which the customer account was created, or end users to which an application implemented at the SDAS is exposed) may send requests to process new streams using InitiateStreamProcessing requests 847 in some embodiments. A decision as to whether to accept or reject the request may then be made by an FN of the SDAS as described earlier, e.g., using CSRs to determine a current concurrency count of streams of the corresponding customer account, as well as request rate acceleration metrics in some embodiments. The decision may be indicated to the client via a ThrottlingDecision message 849 in the depicted embodiment.

A TerminateStream message 817 may be submitted via programmatic interfaces 877 in some embodiments to indicate that a stream which was being processed has ended. In response, as indicated above, the count of concurrent streams in a CSR for the customer account whose stream is ending may be decremented, SIP records for the stream may be deleted from a base data store, and so on in the depicted embodiment, and a StreamTerminated message 819 may be sent to the client.

In at least one embodiment, a client may submit a GetStreamProcessingMetrics request 837 to obtain metrics pertaining to one or more streams associated with a particular customer account. Such metrics may include, for example, the total number of stream analysis requests associated with the customer account that were received over a particular time interval at the SDAS, the rates at which such requests were received, the fraction of the requests that were accepted, the durations for which accepted streams lasted, and so on. One or more MetricSet messages 839 may be sent to the client to provide the requested metrics in some embodiments.

An ExplainRejections request 821 may be sent to the SDAS in some embodiments to explain why one or more stream analysis requests were rejected. In response one or more RejectionExplanations messages 823 may be sent to the client in some embodiments, indicating the reasons (e.g., request rate acceleration metrics exceeding acceptable thresholds, or absolute concurrency exceeding acceptable thresholds) which led to the rejections.

It is noted that in some embodiments, programmatic interactions other than those shown in FIG. 8 may be supported by an SDAS for operations related to processing of streams on behalf of customers.

Figure 9:
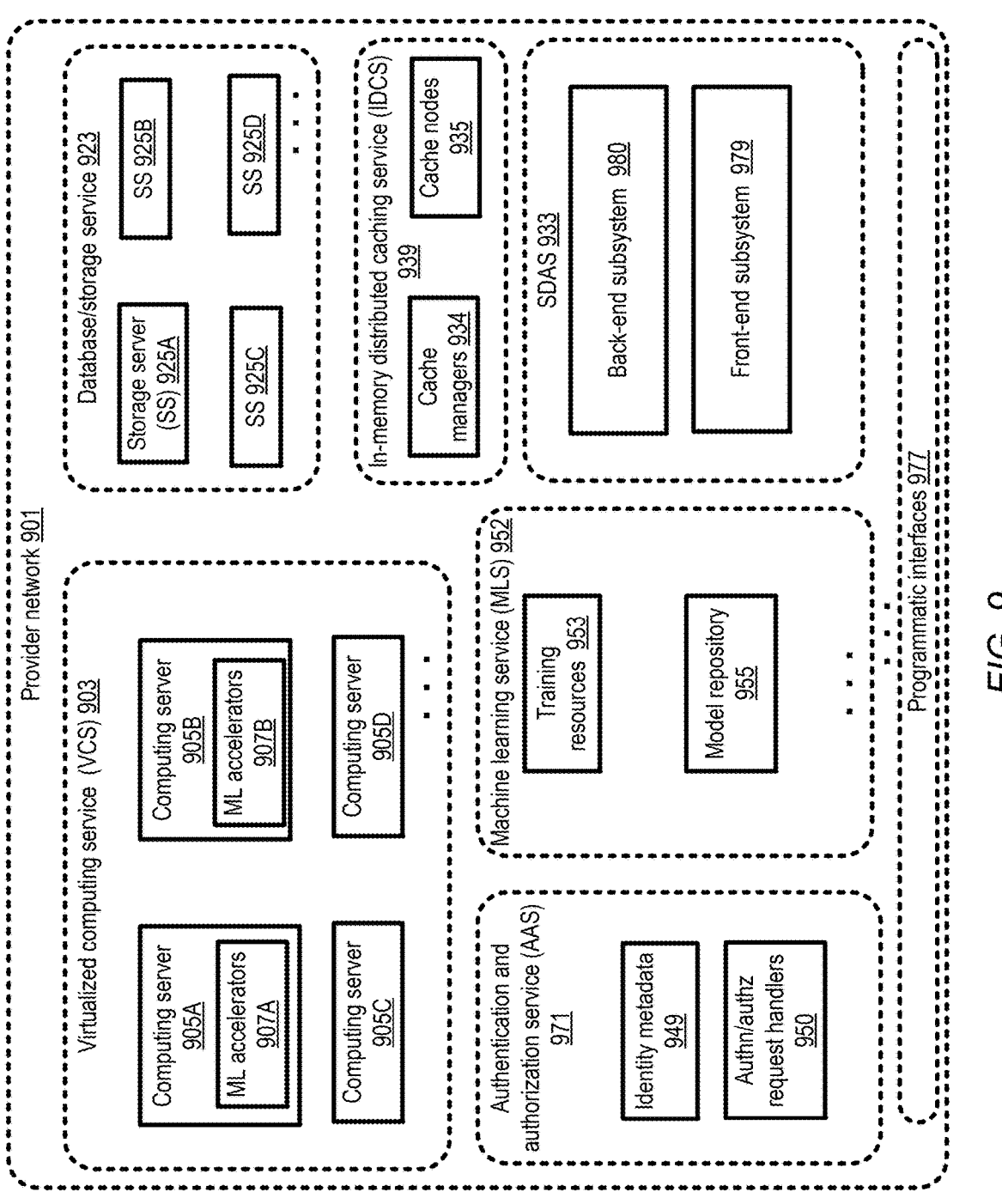
FIG. 9 illustrates an example provider network at which a streaming data analytics service may be implemented, according to at least some embodiments.

As indicated earlier, in some embodiments an SDAS may be implemented at a cloud provider network or cloud computing environment. FIG. 9 illustrates an example provider network at which a streaming data analytics service may be implemented, according to at least some embodiments. In the depicted embodiment, provider network 901 may comprise resources used to implement a plurality of network-accessible services, including for example a virtualized computing service (VCS) 903, a database/storage service 923, an in-memory distributed caching service (IDCS) 939, an authentication and authorization service (AAS) 971, a machine learning service (MLS) 952, and an SDAS 933. The SDAS may comprise a back-end subsystem 980 comprising some set of analytics servers, and a front-end subsystem 979 at which throttling decisions of the kind introduced earlier may be implemented for stream analysis requests. In at least some embodiments, the back-end subsystem may utilize one or more machine learning models of model repository 955 of MLS 952 to analyze stream data. The models may be trained with the help of training resources 953 (e.g., training coordinator software) in some embodiments.

In the embodiment shown in FIG. 9, the VCS may comprise a plurality of servers (e.g., servers 905A, 905B, 905C or 905D). Respective groups of compute instances or virtual machines may be run on individual ones of the computing servers at the request of provider network clients. At least some of the servers may include a set of machine learning accelerators (MLAs) such as 907A or 907B, which can be used for training or fine tuning machine learning models. The SIP records used for throttling-related operations as described above, large data sets used for training models used at the SDAS, and/or learned baseline or custom weights of the models, may be stored using storage servers (SSs) of database/storage service 923, such as SS 925A, 925B, 925C or 925D. In at least some embodiments, the database/storage service 923 may support read acceleration caches of the kind described earlier. The AAS 971 may be used to store identity metadata 949 and may include authentication and authorization request handlers 950 that manage permissions pertaining to the processing of data streams for various customer accounts by the SDAS. IDCS 939 may include cache managers 934 and a set of cache nodes 935 at which CSRs may be stored in some embodiments. The cache managers may be responsible, for example, for ensuring consistency of the CSRs maintained for throttling decisions, deleting expired CSRs, and so on. Components of a given service of a provider network may thus in general utilize components of other services in the depicted embodiment. Individual ones of the services shown in FIG. 9 may implement a respective set of programmatic interfaces 977 which can be used by external and/or internal clients (where the internal clients may comprise components of other services) in one embodiment. In at least some embodiments, resources of a cloud provider network may not be required for the kinds of techniques introduced above; instead, for example, a standalone set of resources may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an SDAS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A VCS of the cloud provider network may offer virtual compute instances (also referred to as virtual machines, or simply "instances") with varying computational and/or memory resources in various embodiments, which may be used to implement components of an SDAS. In one embodiment, each of the virtual compute instances may correspond to one of several instance types, families or categories, and instances of any of several families may be employed for computations of the SDAS. An instance type may be characterized by its hardware type, computational resources (e.g., number, type, and configuration of central processing units (CPUs) or CPU cores, GPUs, ML accelerators or hardware accelerators for other types of tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the SDAS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 10:
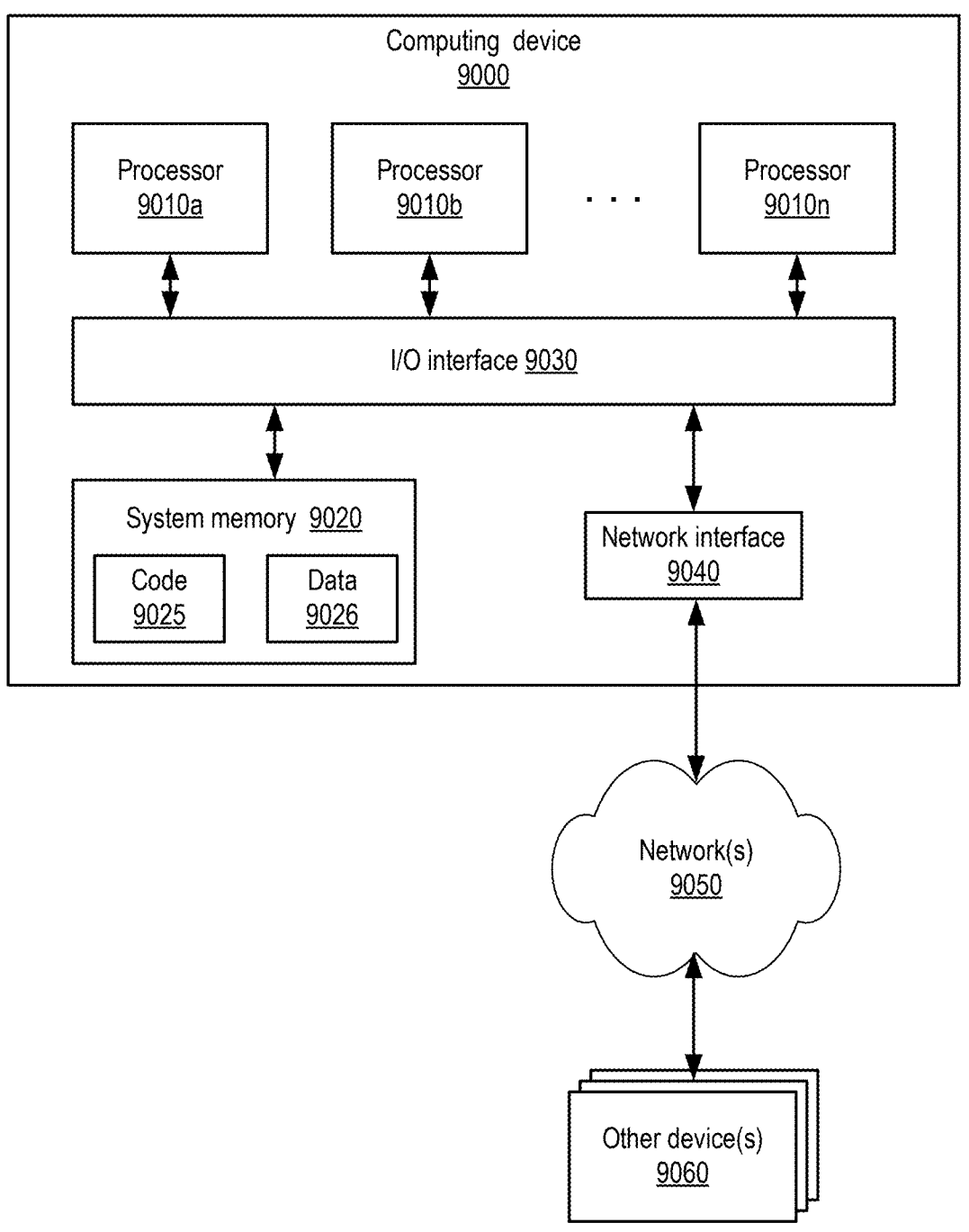
FIG. 10 is a block diagram illustrating an example computing device that may be used in at least some embodiments.

In at least some embodiments, a server that implements the types of techniques described herein (e.g., including the described functionality of various SDAS components and components of other services of cloud provider networks), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
determine, at a streaming data analysis service, a first set of account-specific request throttling parameters for requests from a first customer account, wherein the first set of account-specific request throttling parameters includes a first request rate acceleration threshold which differs from respective request rate acceleration thresholds of other sets of account-specific request throttling parameters for requests from other customer accounts;
in response to receiving, at the streaming data analysis service via one or more programmatic interfaces from a client associated with the first customer account, a first analysis request for a first stream, retrieve, to a particular front-end node of a plurality of front-end nodes of the streaming data analysis service, from a consistent distributed cache accessible to the plurality of front-end nodes, a plurality of concurrency snapshot records of the first customer account, wherein an individual concurrency snapshot record of the plurality of concurrency snapshot records indicates at least a number of in-progress streams of the first customer account at a particular time;
compute, at the particular front-end node, using at least the plurality of concurrency snapshot records, a first request rate acceleration metric of the first customer account;
accept, by the particular front-end node, based at least in part on the first request rate acceleration metric and the first request rate acceleration threshold, the first analysis request; and
initiate processing of the first stream;
cause, prior to completion of processing of the first stream, a sequence of timestamped stream-in-progress records associated with the first stream to be stored in a repository other than the consistent distributed cache; and
in response to a subsequent cache miss in the consistent distributed cache, store a particular concurrency snapshot record of the first customer account in the consistent distributed cache, wherein content of the particular concurrency snapshot record is based at least in part on analysis of timestamps of at least a portion of the sequence of timestamped stream-in-progress records associated with the first stream.

2. The system as recited in claim 1, wherein to accept the first analysis request, the one or more computing devices include further instructions that upon execution on or across the one or more computing devices:
determine that a current number of in-progress streams of the first customer account is smaller than a first concurrency limit.

3. The system as recited in claim 1, wherein the one or more computing devices include further instructions that upon execution on or across the one or more computing devices:
in response to receiving, at the streaming data analysis service via the one or more programmatic interfaces from a second client associated with a second customer account, a second analysis request for a second stream,
determine that acceptance of the second analysis request would not result in the number of in-progress streams of the second customer account exceeding a concurrency limit associated with the second customer account;
retrieve, from the consistent distributed cache, a second plurality of concurrency snapshot records of the second customer account;
compute, using at least the second plurality of concurrency snapshot records, a second request rate acceleration metric of the second customer account; and
reject the second analysis request based at least in part on the second request rate acceleration metric.

4. The system as recited in claim 1, wherein the first analysis request results from invocation of a first application programming interface (API) of a plurality of APIs of the streaming data analysis service, wherein the first request rate acceleration metric pertains to requests associated with the first API, wherein the first request rate acceleration threshold pertains to requests associated with the first API, and wherein the first set of account-specific request throttling parameters includes a second request rate acceleration threshold pertaining to a second API of the plurality of APIs.

5. The system as recited in claim 1, wherein the one or more computing devices include further instructions that upon execution on or across the one or more computing devices:

in response to receiving, at the streaming data analysis service via the one or more programmatic interfaces from a second client associated with a second customer account, a second analysis request for a second stream, accept the second analysis request based at least in part on determining that the number of in-progress streams of the second customer account is smaller than a first concurrency level, wherein the second analysis request is accepted without taking a second request rate acceleration metric of the second customer account into consideration.

6. A computer-implemented method, comprising:

in response to receiving, at a streaming data analysis service via one or more programmatic interfaces from a first client associated with a first customer account, a first analysis request for a first stream, retrieving, from a first data store, a first set of concurrency snapshot records of the first customer account, wherein an individual concurrency snapshot record of the first set of concurrency snapshot records indicates at least a number of in-progress streams of the first customer account at a particular time;

computing, using at least the first set of concurrency snapshot records, a first request rate acceleration metric of the first customer account;

accepting, based at least in part on the first request rate acceleration metric, the first analysis request; and initiating analysis of the first stream.

7. The computer-implemented method as recited in claim 6, further comprising:

causing, prior to completion of processing of the first stream, one or more timestamped stream-in-progress records associated with the first stream to be stored in a second data store; and populating one or more concurrency snapshot records of the first data store based at least in part on analysis of the one or more timestamped stream-in-progress records.

8. The computer-implemented method as recited in claim 6, wherein said accepting the first analysis request is based at least in part on:

determining that a current number of in-progress streams of the first customer account is smaller than a first concurrency limit.

9. The computer-implemented method as recited in claim 6, further comprising:

in response to receiving, at the streaming data analysis service via the one or more programmatic interfaces from a second client associated with a second customer account, a second analysis request for a second stream, determining that acceptance of the second analysis request would not result in the number of in-progress streams of the second customer account exceeding a second concurrency limit associated with the second customer account;

retrieving, from the first data store, a second set of concurrency snapshot records of the second customer account;

computing, using at least the second set of concurrency snapshot records, a second request rate acceleration metric of the second customer account; and rejecting the second analysis request based on the second request rate acceleration metric.

10. The computer-implemented method as recited in claim 6, wherein the first analysis request results from invocation of a first application programming interface (API) of a plurality of APIs of the streaming data analysis service, wherein the first request rate acceleration metric pertains to requests associated with the first API, and wherein accepting the first analysis request comprises comparing the first request rate acceleration metric to a first acceleration threshold associated with the first API, the computer-implemented method further comprising:

in response to receiving, at the streaming data analysis service from the first client, a second analysis request for a second stream, wherein the second analysis request results from invocation of a second API of the plurality of APIs, determining whether to accept the second analysis request based at least in part on (a) a second request rate acceleration metric which pertains to requests which invoke the second API and (b) a second acceleration threshold associated with the second API.

11. The computer-implemented method as recited in claim 6, further comprising:

in response to receiving, at the streaming data analysis service via the one or more programmatic interfaces from a second client associated with a second customer account, a second analysis request for a second stream, accepting the second analysis request based at least in part on determining that the number of in-progress streams of the second customer account is smaller than a first concurrency level, wherein the second analysis request is accepted without taking a second request rate acceleration metric of the second customer account into consideration.

12. The computer-implemented method as recited in claim 6, further comprising:

determining, based at least in part on a resource utilization metric of the streaming data analysis service, that the first request rate acceleration metric is to be computed.

13. The computer-implemented method as recited in claim 6, wherein the streaming data analysis service comprises one or more of: (a) a transcription service or (b) a chatbot service.

14. The computer-implemented method as recited in claim 6, wherein the first data store comprises a distributed in-memory cache of a cloud-based caching service.

15. The computer-implemented method as recited in claim 6, further comprising:

expiring individual ones of the concurrency snapshot records in the first data store based at least in part on a respective expiration parameter.

16. One or more non-transitory computer-accessible storage media storing program instructions that when executed on or across one or more processors:

in response to receiving, at a streaming data analysis service via one or more programmatic interfaces from a first client associated with a first customer account, a first analysis request for a first stream, retrieve, from a first data store, a first set of concurrency snapshot records of the first customer account, wherein an individual concurrency snapshot record of the first set of concurrency snapshot records indicates at least a number of in-progress streams of the first customer account at a particular time;

compute, using at least the first set of concurrency snapshot records, a first request rate acceleration metric of the first customer account;

accept, based at least in part on the first request rate acceleration metric, the first analysis request; and initiate analysis of the first stream.

17. The one or more non-transitory computer-accessible storage media as recited in claim 16, storing further program instructions that when executed on or across the one or more processors:

cause, prior to completion of processing of the first stream, one or more timestamped stream-in-progress records associated with the first stream to be stored in a second data store; and populate one or more concurrency snapshot records of the first data store based at least in part on analysis of the one or more timestamped stream-in-progress records.

18. The one or more non-transitory computer-accessible storage media as recited in claim 17, wherein the one or more concurrency snapshot records that are populated at the first data store include a particular concurrency snapshot record which is (a) associated with the first customer account and (b) populated based at least in part on analysis of respective stream-in-progress records of a plurality of streams associated with the first customer account.

19. The one or more non-transitory computer-accessible storage media as recited in claim 16, wherein to accept the first analysis request, the one or more non-transitory computer-accessible storage media store further program instructions that when executed on or across the one or more processors:

determine that a current number of in-progress streams of the first customer account is smaller than a first concurrency limit.

20. The one or more non-transitory computer-accessible storage media as recited in claim 16, storing further program instructions that when executed on or across the one or more processors:

in response to acceptance of the first analysis request, update a particular concurrency snapshot record in the first data store to increment a number of in-progress streams of the first customer account; and in response to termination of analysis of the first stream, update another concurrency snapshot record in the first data store to decrement a number of in-progress streams of the first customer account.

* * * * *